United States Patent
Yang

(10) Patent No.: US 10,199,638 B2
(45) Date of Patent: Feb. 5, 2019

(54) COMPOSITE ANODE ACTIVE MATERIAL, METHOD OF PREPARING THE SAME, AND ANODE AND LITHIUM SECONDARY BATTERY INCLUDING THE COMPOSITE ANODE ACTIVE MATERIAL

(71) Applicants: Samsung Electronics Co., Ltd., Suwon-si, Gyeonggi-do (KR); Samsung SDI Co., Ltd., Yongin-si. Gyeonngi-do (KR)

(72) Inventor: Jeeeun Yang, Uiwang-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 437 days.

(21) Appl. No.: 14/982,790

(22) Filed: Dec. 29, 2015

(65) Prior Publication Data

US 2016/0190548 A1 Jun. 30, 2016

(30) Foreign Application Priority Data

Dec. 31, 2014 (KR) .................. 10-2014-0195961

(51) Int. Cl.
*H01M 4/02* (2006.01)
*H01M 4/04* (2006.01)
(Continued)

(52) U.S. Cl.
CPC ......... *H01M 4/134* (2013.01); *H01M 4/0402* (2013.01); *H01M 4/1395* (2013.01);
(Continued)

(58) Field of Classification Search
CPC ...... H01M 4/134; H01M 4/366; H01M 4/622; H01M 4/386; H01M 4/1395; H01M 4/0402; H01M 10/052; H01M 2004/027
See application file for complete search history.

(56) References Cited

U.S. PATENT DOCUMENTS

2004/0137327 A1* 7/2004 Gross ............... B22F 1/0003
429/231.8
2007/0014917 A1 1/2007 Binnewies et al.
(Continued)

FOREIGN PATENT DOCUMENTS

JP 2012-527518 A 11/2012
KR 2008-0013822 A 2/2008
(Continued)

OTHER PUBLICATIONS

Wong et al., "A stable silicon/graphene composite using solvent exchange method as anode material for lithium ion batteries," Jul. 4, 2013 (Online), Carbon, 63, 397-403. (Year: 2013).*
(Continued)

*Primary Examiner* — Ula C Ruddock
*Assistant Examiner* — Matthew W Van Oudenaren
(74) *Attorney, Agent, or Firm* — Cantor Colburn LLP

(57) ABSTRACT

A composite anode active material including: a silicon material and a coating layer formed on at least a portion of a surface of the silicon material, wherein the coating layer is chemically bonded to the silicon material, and wherein the coating layer includes a hydrosilylation product of a C4-C30 alkene having a terminal —C(=O)OR group, wherein R is a hydrogen, a C1-C5 alkyl group, a C2-C6 heteroalkyl group, a C6-C12 aryl group, or a C7-C13 arylalkyl group, each of which except hydrogen is substituted or unsubstituted.

17 Claims, 6 Drawing Sheets

(51) Int. Cl.

| | | |
|---|---|---|
| *H01M 4/36* | (2006.01) | |
| *H01M 4/38* | (2006.01) | |
| *H01M 4/62* | (2006.01) | |
| *H01M 4/134* | (2010.01) | |
| *H01M 10/052* | (2010.01) | |
| *H01M 4/1395* | (2010.01) | |

(52) U.S. Cl.
CPC .......... *H01M 4/366* (2013.01); *H01M 4/386* (2013.01); *H01M 4/622* (2013.01); *H01M 10/052* (2013.01); *H01M 2004/027* (2013.01); *Y02T 10/7011* (2013.01)

(56) References Cited

U.S. PATENT DOCUMENTS

| | | |
|---|---|---|
| 2012/0244435 A1 | 9/2012 | Hirose et al. |
| 2013/0004846 A1 | 1/2013 | Kim et al. |
| 2013/0219704 A1 | 8/2013 | Haugseter et al. |
| 2013/0316244 A1 | 11/2013 | Zhang et al. |
| 2014/0050981 A1 | 2/2014 | Kang et al. |
| 2016/0013491 A1 | 1/2016 | Liu et al. |

FOREIGN PATENT DOCUMENTS

| | | |
|---|---|---|
| KR | 2012-0066669 A | 6/2012 |
| KR | 2012-0109908 A | 10/2012 |
| KR | 2013-0134239 A | 12/2013 |
| KR | 1342601 B1 | 12/2013 |

OTHER PUBLICATIONS

He et al., "Structure and electrochemical performance of nanostructured Fe3O4/carbon nanotube composites as anodes for lithium ion batteries," Oct. 13, 2009 (Online), Electrochimica Acta, 55, 1140-1144. (Year: 2009).*

Yixuan Yu et al. "Room Temperature Hydrosilylation of Silicon Nanocrystals with Bifunctional Terminal Alkenes" Langmuir, 2013, 29, 1533-1540.

\* cited by examiner

COMPOSITE ANODE ACTIVE MATERIAL, METHOD OF PREPARING THE SAME, AND ANODE AND LITHIUM SECONDARY BATTERY INCLUDING THE COMPOSITE ANODE ACTIVE MATERIAL

CROSS-REFERENCE TO RELATED APPLICATION

This application claims priority to and the benefit of Korean Patent Application No. 10-2014-0195961, filed on Dec. 31, 2014, in the Korean Intellectual Property Office, the content of which is incorporated herein in its entirety by reference.

BACKGROUND

1. Field

The present disclosure relates to a composite anode active material, a method of preparing the composite anode active material, an anode including the composite anode active material, and a lithium secondary battery including the anode.

2. Description of the Related Art

Due to high energy density and convenience in design, lithium secondary batteries have served as a main source of electrical power of mobile electronic devices, and the application of the lithium secondary battery using as a power source of an electrical vehicle or an electrical power storage device of renewable energy has been broaden out. In order to match this demand of the market, studies on materials of a lithium secondary battery having high energy density and long lifespan characteristics have been continuously carried out. Among anode materials, for example, studies on various materials such as silicon, tin, or germanium, as well as carbon have been conducted.

Among the anode materials, a silicon material has high energy density compared to that of a graphite material, which is commonly used as an anode active material. However, when a silicon material is used as an anode active material, an unstable solid electrolyte interface (SEI) layer may be formed by a side reaction between a silicon surface and an electrolyte, which deteriorates electrochemical characteristics of the anode active material. Also, due to internal stress caused by rapid volume expansion that occurs during a charging/discharging process, the silicon material may be pulverized. Therefore, a composite anode active material that may prevent formation of an SEI layer by suppressing a side reaction between a silicon surface and an electrolyte and may suppress rapid volume expansion that occurs during a charging/discharging process is needed.

SUMMARY

Provided are a composite anode active material having a structural stability, a method of preparing the composite anode active material, an anode including the composite anode active material, and a lithium secondary battery having improved lifespan and durability by including the anode.

Additional aspects will be set forth in part in the description which follows and, in part, will be apparent from the description, or may be learned by practice of the presented exemplary embodiments.

According to an aspect of an exemplary embodiment, a composite anode active material includes:
a silicon material; and
a coating layer that is formed on at least a portion of a surface of the silicon material,
wherein the coating layer is chemically bonded to the silicon material, and
wherein the coating layer includes a hydrosilylation product of a C4-C30 alkene having a terminal —C(=O)OR group, wherein R is a hydrogen, a C1-C5 alkyl group, a C2-C6 heteroalkyl group, a C6-C12 aryl group, or a C7-C13 arylalkyl group, each of which except hydrogen is substituted or unsubstituted.

According to another aspect of an exemplary embodiment, a method of preparing the composite anode active material includes:
obtaining a hydride-terminated silicon material by etching the silicon material; and
reacting the hydride-terminated silicon material with a C4-C30 alkene having a terminal —C(=O)OR group to obtain a hydrosilylation product comprising a terminal —C(=O)OR group, wherein R is a hydrogen, a C1-C5 alkyl group, a C2-C6 heteroalkyl group, a C6-C12 aryl group, or a C7-C13 arylalkyl group, each of which except hydrogen is substituted or unsubstituted to obtain the composite anode active material.

The method of preparing the composite anode active material can further include:
reacting a polymer having a functional group capable of reacting with the terminal —C(=O)OR group of the hydrosilylation product to obtain the composite anode active material.

According to another aspect of an exemplary embodiment, an anode includes the composite anode active material.

According to another aspect of an exemplary embodiment, a lithium secondary battery includes the anode.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1A:
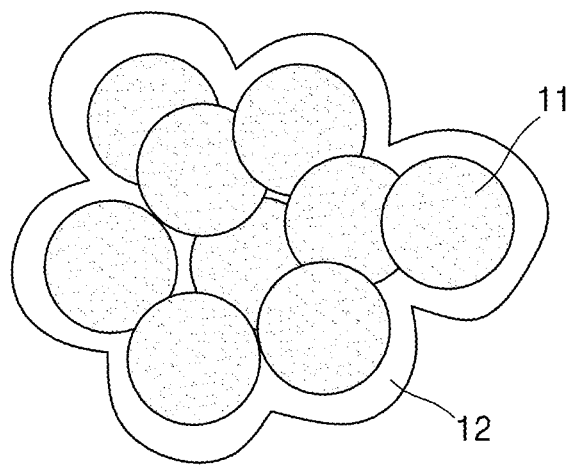
FIGS. 1A and 1B are schematic views of a structure of a composite anode active material according to an exemplary embodiment.

Reference will now be made in detail to exemplary embodiments of a composite anode active material, a method of preparing the anode active material, and an anode and a lithium secondary battery including the composite anode active material, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present inventive concept. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

According to an aspect of an exemplary embodiment, an anode active material includes:

a silicon material; and a coating layer formed on at least one surface of the silicon material, wherein the coating layer is chemically bonded to the silicon material, and wherein the coating layer contains a hydrosilylation product of a C4-C30 alkene having a terminal —C(=O)OR group, wherein R is a hydrogen, a C1-C5 alkyl group, a C2-C6 heteroalkyl group, a C6-C12 aryl group, or a C7-C13 arylalkyl group, each of which except hydrogen is substituted or unsubstituted.

The hydrosilylation product of the C4-C30 alkene having the terminal —C(=O)OR group is a hydrosilylation product of the hydride-terminated silicon material derived from the silicon material and the C4-C30 alkene having the terminal —C(=O)OR group. As used herein, the term "hydrosilylation" refers to a reaction of adding hydrogen and silicon to a double bond of the alkene. The hydride-terminated silicon material refers to a product that is prepared by etching a silicon material with an acid.

The coating layer can further include a polymer that has been chemically reacted with the —C(=O)OR group of the hydrosilylation product. In this regard, the coating layer further includes a polymer that has a functional group that is capable of reacting with the terminal —C(=O)OR group of the hydrosilylation product, and an example of the functional group that is capable of reacting with the hydrosilylation product is a hydroxyl group (—OH).

When the coating layer further includes the polymer, the coating layer includes the reaction product of the hydrosilylation product of the C4-C30 alkene having the terminal —C(=O)OR group and the polymer. Here, the reaction product refers to the resultant that is obtained by dehydrating condensation of the —C(=O)OR group of the hydrosilylation product of the C4-C30 alkene having the terminal —C(=O)OR group with a hydroxyl group (—OH) of the polymer.

The polymer may be a polymer for a binder that is used in preparation of an electrode used in a lithium secondary battery. The polymer for a binder has a structure that is fixed to a silicon anode active material via a linker obtained by a C4-C30 alkene having the terminal —C(=O)OR group.

The polymer may be, for example, at least one selected from a polyvinyl alcohol material, a polyvinyl(acetate) material, and a cellulose ether material.

When the silicon material is used as an anode active material, lithium and silicon may form an alloy as lithium intercalates in or deintercalates from an anode active material layer formed on an anode current collector, and thus a volume of the anode active material may expand. Thus, the function of a binder in an anode active material layer may be partially lost. As a result, due to internal stress, the silicon material may be pulverized, and an electrical contact with it may be lost. As a result, a capacity of an anode decreases, and the anode may be partially destructed.

On the other hand, in a composite anode active material according to an embodiment, the polymer, which is a binder, is fixed to the silicon material, and thus when lithium intercalates and deintercalates during charging/discharging of a battery, in spite of repeated destruction of an electrode structure due to volume expansion of the anode active material, the binder may be maintained stable with the silicon material. Therefore, since binding between the silicon based material and the binder is stable, structural stability of the composite anode active material is improved. Thus, when the composite anode active material is used, a lithium secondary battery may have improved lifespan and durability.

As used herein, the composite anode active material is an anode active material that is prepared by bonding at least two materials having different physical or chemical properties, wherein characteristics of the composite anode active material are different from those of each of the materials that constitute the composite anode active material, and the materials are distinctive in macro or micro scales in the finished structure.

The C4-C30 alkene having the terminal —C(=O)OR group may be a compound represented by Formula 1:

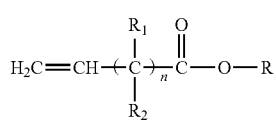

Formula 1

In Formula 1, n is an integer of 1 to 10, and $R_1$, $R_2$, and R are each independently a hydrogen, a C1-C5 alkyl group, a C2-C6 heteroalkyl group, a C6-C12 aryl group, or a C7-C13 arylalkyl group, each of which is substituted or unsubstituted.

As used herein, the term "alkyl group" refers to a completely saturated and branched or non-branched (or chained or linear) hydrocarbon group. Examples of "alkyl" include methyl, ethyl, n-propyl, iso-propyl, n-butyl, iso-butyl, sec-butyl, n-pentyl, iso-pentyl, neo-pentyl, n-hexyl, 3-methylhexyl, 2,2-dimethylpentyl, 2,3-dimethylpentyl, and n-heptyl. Also, at least one hydrogen atom of the alkyl group may be substituted with a halogen atom, a C1-C20 alkyl group substituted with a halogen atom (e.g., —$CH_2CF_3$, —$CH_2F$, or —$CCl_3$), a C1-C20 alkoxy group, a C2-C20 alkoxyalkyl group, a hydroxyl group, a nitro group, a cyano group, an amino group, an amidino group, a hydrazine group, a hydrazone group, a carboxylic acid group or its salt, a sulfonyl group, a sulfamoyl group, a sulfonic acid group or its salt, a phosphoric acid group or its salt, a C1-C20 alkyl group, a C2-C20 alkenyl group, a C2-C20 alkynyl group, a C1-C20 heteroalkyl group, a C3-C20 aryl group, a C7-C20 arylalkyl group, a C6-C20 heteroaryl group, a C7-C20 heteroarylalkyl group, a C6-C20 heteroaryloxy group, or a C6-C20 heteroaryloxyalkyl group.

As used herein, the term "heteroalkyl group" refers to an alkyl group as defined above in which at least one carbon atom is replaced with a heteroatom selected from nitrogen (N), oxygen (O), phosphorus (P), or sulfur (S) and having carbon as remaining atoms. Examples of "heteroalkyl" are methoxyethyl, methylthioethyl, and dimethylaminoethyl.

As used herein, the term "aryl group" refers to an aromatic system containing at least one ring. Examples of "aryl" may include a phenyl group, a naphthyl group, and a tetrahydronaphthyl group.

As used herein, the term "arylalkyl group" refers to an alkyl group bound to an aryl group. Examples of "arylalkyl" may include a benzyl group or a phenethyl group.

An alkyl group, a heteroalkyl group, an aryl group, and an arylalkyl group used in the chemical formulae of the present application may include a "substituent" selected from a halogen atom, a $C_1$-$C_{20}$ alkyl group substituted with a halogen atom, such as $CF_3$, $CHF_2$, $CH_2F$, or $CCl_3$, a hydroxy group, a nitro group, a cyano group, an amino group, an amidino group, a hydrazine group, a hydrazone group, a carboxylic acid group or a salt thereof, a sulfonic acid group or a salt thereof, and a phosphoric acid group or a salt thereof; or a "substituent" substituted with at least one selected from a $C_1$-$C_{20}$ alkyl group, a $C_2$-$C_{20}$ alkenyl group, a $C_2$-$C_{20}$ alkynyl group, a $C_3$-$C_{20}$ cycloalkyl group, a $C_6$-$C_{20}$ aryl group, a $C_6$-$C_{20}$ heteroaryl group, a $C_7$-$C_{20}$ aryl alkyl group, and a $C_6$-$C_{20}$ heteroaryl alkyl group.

When a group containing a specified number of carbon atoms is substituted with any of the groups listed in the preceding paragraph, the number of carbon atoms in the resulting "substituted" group is defined as the sum of the carbon atoms contained in the original (unsubstituted) group and the carbon atoms (if any) contained in the substituent. For example, when the term "substituted $C_1$-$C_{20}$ alkyl" refers to a $C_1$-$C_{20}$ alkyl group substituted with $C_6$-$C_{20}$ aryl group, the total number of carbon atoms in the resulting aryl substituted alkyl group is $C_7$-$C_{40}$.

The compound represented by Formula 1 may be a compound represented by Formula 2:

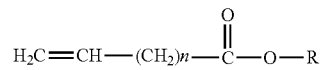

Formula 2

In Formula 2, n is an integer of 2 to 10, and

R is a hydrogen, a methyl group, or an ethyl group.

The compound represented by Formula 1 may be at least one selected from compounds represented by Formulae 3 to 5, 10-undecenoic acid, methyl 10-undecenoate, ethyl 10-undecenoate, 4-pentenoic acid, methyl 4-pentenate, ethyl 4-pentenate, 2-methyl-4-pentenoic acid, 3-methyl-4-pentenoic acid, 2,2-dimethyl-4-pentenoic acid, 8-nonenoic acid, methyl 8-nonenoate, and ethyl 8-nonenoate.

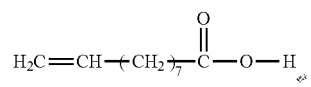

Formula 3

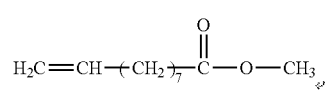

Formula 4

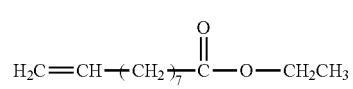

Formula 5

In the composite anode active material according to an embodiment, the silicon material may include silicon (Si), $SiO_x$ (wherein 0<x<2), a silicon alloy (a Si—Z alloy, where, Z is an alkaline metal, an alkaline earth metal, a Group 13-16 element, a transition metal, a rare earth element, or a combined element thereof, and is not Si). Examples of the element Z may include Mg, Ca, Sr, Ba, Ra, Sc, Y, La, Ti, Zr, Hf, V, Nb, Ta, Cr, Mo, W, Tc, Re, Fe, Ru, Os, Co, Rh, Ir, Ni, Pd, Pt, Cu, Ag, Au, Zn, Cd, B, Ge, P, As, Sb, Bi, S, Se, Te, Po, or a combination thereof.

An amount of the C4-C30 alkene having the terminal —C(=O)OR group may be in a range of about 0.1 part to about 50 parts by weight, for example, about 5 parts to about 15 parts by weight based on 100 parts by weight of the silicon material. While not wishing to be bound by theory, it is believed that when the amount of the C4-C30 alkene having the terminal —C(=O)OR group is within this range, a side reaction of the silicon material and an electrolyte may be excellent, and thus formation of an SEI layer on a surface of the silicon material may be effectively suppressed.

An amount of the polymer having a functional group capable of reacting with the —C(=O)OR group of the C4-C30 alkene having the terminal —C(=O)OR group may be in a range of about 0.01 part to about 50 parts by weight, for example, about 10 parts to about 25 parts by weight based on 100 parts by weight of the silicon material. While not wishing to be bound by theory, it is believed that when the amount of the polymer is within this range, destruction of the anode due to unstable binding of the silicon material and the binder under repeated charging/discharging conditions may be prevented, and thus, a lithium secondary battery may have excellent durability and lifespan characteristics.

In the composite anode active material according to an embodiment, the coating layer may include a unit represented by Formula 6 or Formula 7:

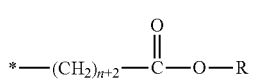

Formula 6

In Formula 6,
n is an integer of 1 to 10,
R is a hydrogen, a methyl group, or an ethyl group, and
* is a binding site to a surface of the silicon material.

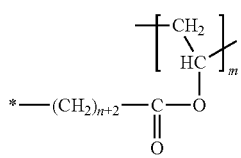

Formula 7

In Formula 7,
n is an integer of 1 to 10,
m is an integer of 5 to 18,000, and
* is a binding site to a surface of the silicon material.

The coating layer may, for example, completely cover the silicon material. The coating layer may be a continuous coating layer or a discontinuous layer in the form of islands.

A thickness of the coating layer may be in a range of about 1 nanometers (nm) to about 200 nm, for example, about 30 nm to about 200 nm. While not wishing to be bound by theory, it is believed that when the composite anode active material including the coating layer within this range is used, a side reaction of an electrolyte with an anode active material may be suppressed, and an anode having improved electrochemical characteristics and durabilities may be manufactured.

The composite anode active material may further include a carbon material. The carbon material may be, for example, at least one selected from carbon nanotubes (CNTs), graphites, carbon fibers, and graphene.

CNTs may be, for example, single-wall CNTs, multi-wall CNTs, or combination thereof. For example, an average aspect ratio of the CNTs may be about 300 or less, or, for example, about 250 or less, or, for example, in a range about 50 to about 200.

The term "average aspect ratio" used herein is a ratio of average length to average diameter (average length/average diameter ratio); "average diameter" is an average value of diameters of the thickest parts of at least 10 CNTs observed by using a scanning electron microscope; and "average length" is an average value of lengths of the lengths of at least 10 CNTs observed by using a SEM.

An average diameter of the CNTs may be in a range of, for example, about 1 nm to about 50 nm. While not wishing to be bound by theory, it is believed that when the average diameter of the CNTs is within this range above, the CNTs are evenly arranged on at least one surface of the silicon material, and thus electrical conductivity of the silicon material may improve, which may result in improvement in charging/discharging rate characteristics.

The CNTs may optionally undergo activation treatment. Here, the activation treatment may be performed by using at least one selected from acids, such as nitric acid or sulfuric acid, and oxidizing agents such as potassium permanganate and treating with ultrasound waves. When the CNTs undergo such activation treatment, conductivity of the CNTs may improve.

An amount of the carbon material may be in a range of about 5 parts to about 60 parts by weight, or, for example, about 10 parts to about 50 parts by weight, based on 100 parts by weight of the silicon material. When the amount of the carbon material is within this range, an anode having excellent durability may be manufactured without deterioration in its electrochemical characteristics.

Figure 1B:
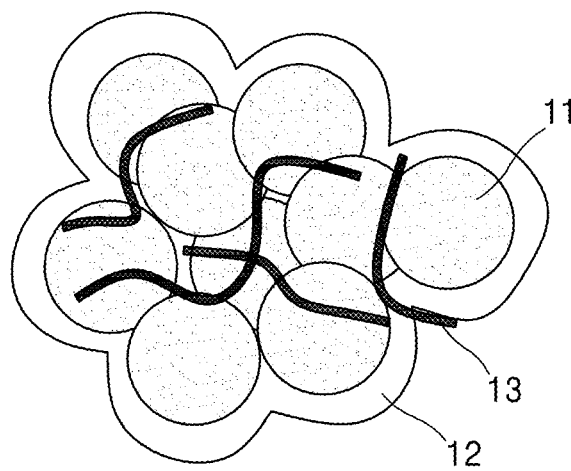

FIGS. 1A and 1B are schematic views of a structure of a composite anode active material according to an embodiment.

Referring to FIG. 1A, the composite anode active material has a coating layer 12 that is formed on at least a portion of a surface of a silicon material 11. The coating layer 12 includes a hydrosilylation product of C4-C30 alkene having the terminal —C(=O)OR group. For example, the coating layer 12 may include a unit that is represented by Formula 6:

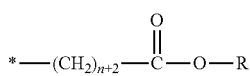

Formula 6

In Formula 6,
n is an integer of 2 to 10,
R is a hydrogen, a methyl group, or an ethyl group, and
* denotes a binding site to a surface of the silicon material 11.

The coating layer 12 may include the reaction product of hydrosilylation product of the C4-C30 alkene having the terminal —C(=O)OR group, wherein R is a hydrogen, a C1-C5 alkyl group, a C2-C6 heteroalkyl group, a C6-C12 aryl group, or a C7-C13 arylalkyl group, each of which except hydrogen is substituted or unsubstituted and the polymer. For example, the coating layer 12 may include a unit represented by Formula 7:

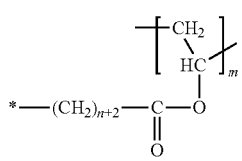

Formula 7

In Formula 7,
n is an integer of 1 to 10,
m is an integer of 5 to 18,000, and
* denotes a binding site to a surface of the silicon material 11.

As shown in FIG. 1B, the composite anode active material may have a structure in which a carbon material 13, such as CNTs, is dispersed in at least one surface of the silicon material 11. As shown in FIG. 1B, the term "dispersion" here refers to the embodiment in which the carbon material 13 is disposed on a surface of the silicon material 11. Also, the term "dispersion" may be understood as including the embodiment in which a part of the carbon material 13 is embedded in the silicon material 11.

In the composite anode active material, a coating layer, which is an inert film with respect to lithium, is formed on a surface of a silicon material, and thus a side reaction between the silicon material and an electrolyte may be suppressed. Thus, formation of an SEI layer on a surface of the silicon material may be suppressed. Also, when the coating layer contains a polymer having a functional group that is capable of reacting with the —C(=O)OR group of a C4-C30 alkene having the terminal —C(=O)OR group, the polymer may be fixed to the silicon material via a linker.

Also, when CNTs are further included as a carbon material, the CNTs may serve as electrical pathways, and thus electrical contact of the composite anode active material may be maintained. Thus, conductivity of a surface of the anode active material improves, which prevents irreversible consumption of lithium, and when the anode active material is partially degraded, the electrical pathways may be connected by a carbon material. Therefore, the anode active material that is partially degraded may be prevented from being electrically isolated. As a result, electrochemical characteristics of an anode may be excellent, and a structure of the anode may be maintained stable, which may improve durability of the anode.

Hereinafter, a method of preparing a composite anode active material will be described.

A silicon oxide layer, which is a natural oxide layer on a silicon material, is removed by etching the silicon material to obtain a hydride-terminated silicon material.

Any etching solution that may remove a silicon oxide layer for an etching process may be used. The etching solution may be, for example, an HF aqueous solution, or a mixture of a HCl aqueous solution and an HF aqueous solution. Also, during the etching process, a solvent that is at least one selected from deionized water, ethanol, methanol, and chloroform may be used.

Then, hydrosilylation of the hydride-terminated silicon material and the C4-C30 alkene having the terminal —C(=O)OR group may be performed to obtain a composite anode active material.

The hydrosilylation may be performed by heat-treating a mixture of the hydride-terminated silicon material and the C4-C30 alkene having the —C(=O)OR group at a temperature in a range of about 20° C. to about 60° C., or, for example, about 25° C. to about 45° C. Here, an amount of the C4-C30 alkene having the —C(=O)OR group is greater than a stoichiometric amount to increase the yield of hydrosilylation. For example, an amount of the C4-C30 alkene having the —C(=O)OR group is in a range of about 100 parts to about 1,100 parts by weight based on about 100 parts by weight of the silicon material. The excess C4-C30 alkene having the —C(=O)OR group is removed during a work-up process. The work-up process may separate out target materials by performing, for example, centrifuge.

When the composite anode active material includes a carbon material, a milling process of silicon particles and the carbon material is performed before performing an etching process on the silicon material.

A device used in the milling process is not particularly limited, and any milling device available in the art may be used. For example, a spex mill or a planetary mill may be used.

A period of time for the milling process may be 60 minutes or less. When the milling is performed more than 60 minutes, the carbon material, such as CNTs, is pulverized to a significant extent, and thus initial efficiency and lifespan of a lithium secondary battery may be deteriorated.

Subsequently, a polymer having a functional group capable of reacting with the terminal —C(=O)OR group of the hydrosilylation product is added to the resultant obtained as described above, and the mixture is allowed to react. The reaction is a reaction in which the hydrosilylation product having the terminal —C(=O)OR group and a functional group (e.g., a hydroxyl group) of the polymer react under condensation conditions, and thus, the polymer is fixed onto the silicon material via a linker part obtained by the hydrosilylation product of the C4-C30 alkene having the terminal —C(=O)OR group.

The reaction is performed at a temperature in a range of about 100° C. to about 300° C., for example, about 150° C. to about 250° C. While not wishing to be bound by theory, it is believed that when the reaction is performed at a temperature within this range, the yield of the reaction between the polymer and alkene is high.

According to another aspect of an embodiment, an anode includes the composite anode active material.

In the preparation of the anode, the anode may include a carbon material in addition to the composite anode active material. The carbon material is not particularly limited, and any material available as a carbon material in the art may be used. For example, the carbon material may be at least one selected from CNTs, graphite, carbon fibers, and graphene. An amount of the carbon material in the composite anode active material may be in a range of about 1 part to about 50 parts by weight, for example, about 5 parts to about 30 parts by weight, based on 100 parts by weight of the composite anode active material.

The anode according to another exemplary embodiment includes the composite anode active material. For example, the anode may be manufactured by molding an anode active material composition including the composite anode active material in a predetermined shape or coating the anode active material composition on a current collector such as a copper foil.

An anode active material composition is prepared by mixing the composite anode active material, a conducting agent, and a solvent. A binder may be further added to the anode active material composition.

The anode active material composition is directly coated on a metal current collector to prepare an anode plate. Alternatively, the anode active material composition is cast on a separate support, and a film detached from the separate support is laminated on a metal current collector to prepare an anode plate. The anode is not limited to the type described above, and any type of an anode may be used.

The current collector may be a metal such as nickel, aluminum, titanium, copper, gold, silver, platinum, an aluminum alloy, or stainless steel, a film prepared by plasma-spraying or arc-spraying a carbonaceous material, activated carbon fiber, nickel, aluminum, zinc, copper, tin, lead, and any alloy thereof, or a conductive film prepared by dispersing a conductive material in a rubber or a resin such as styrene-ethylene-butylene-styrene copolymer (SEBS). For example, aluminum, nickel, or stainless steel may be used. Particularly, aluminum may be used since it can be easily processed into a thin film and is inexpensive. A shape of the current collector is not particularly limited. For example, the current collector may have a thin film shape, a flat plate shape, a mesh shape, a net shape, a punched shape, an embossing shape, or any combination thereof, e.g. a mesh shape flat plate or the like. For example, the current collector may have an uneven surface formed by etching.

The anode active material composition may further include a carbon material in addition to the composite anode active material. For example, the carbon material may be at least one selected from natural graphite, artificial graphite, expanded graphite, graphene, carbon black, CNTs, and carbon fibers. However, embodiments are not limited thereto, and any material available as a carbon material in the art may be used.

The conducting agent may be, for example, acetylene black, ketjen black, natural black, artificial black, carbon black, carbon fibers, a metal powder or metal fiber of copper, nickel, aluminum, or silver; a conductive polymer such as a polyphenylene derivative, a mixture thereof, but embodiments are not limited thereto, and any material available as a conducting agent may be used. Also, a crystalline carbon material may be added as a conducting agent.

Examples of the binder may include lithium polyacrylate, lithium polymethacrylate, vinylidene fluoride/hexafluoropropylene copolymer, polyvinylidene fluoride (PVdF), polyacrylonitrile, polymethylmethacrylate, polyacrylic acid, polyamideimide, polytetrafluoroethylene, and a combination thereof, or a styrene butadiene rubber polymer. However, embodiments are not limited thereto, and any material available as a binder in the art may be used.

Examples of the solvent may include N-methylpyrrolidone (NMP), acetone, and water. However, embodiments are not limited thereto, and any material available as a solvent in the art may be used.

Amounts of the composite anode active material, the conducting agent, the binder, and the solvent may be at the same levels used in a conventional lithium secondary battery. At least one of the conducting agent, the binder, and the solvent may be omitted depending on a use or a structure of the lithium battery.

According to another exemplary embodiment, a lithium secondary battery includes an anode including the composite anode active material. The lithium secondary battery is prepared as follows.

First, an anode is prepared according to the anode preparation method.

Then, a cathode active material, a conducting agent, a binder, and a solvent are mixed to prepare a cathode active material composition. The cathode active material composition is directly coated and dried on a metal current collector to prepare a cathode plate. Alternatively, the cathode active material composition is cast on a separate support, and a film detached from the separate support is laminated on a metal current collector to prepare a cathode plate.

The cathode active material may be at least one selected from a lithium cobalt oxide, a lithium nickel cobalt manganese oxide, a lithium nickel cobalt aluminum oxide, a lithium iron phosphate, and a lithium manganese oxide. However, embodiments are not limited thereto, and any material available as a cathode active material in the art may be used.

For example, the cathode active material may be represented by one of $Li_aA_{1-b}B'_bD'_2$ (wherein $0.90 \leq a \leq 1.8$ and $0 \leq b \leq 0.5$); $Li_aE_{1-b}B'_bO_{2-c}D'_c$ (wherein $0.90 \leq a \leq 1.8$, $0 \leq b \leq 0.5$, and $0 \leq c \leq 0.05$); $LiE_{2-b}B'_bO_{4-c}D'_c$ (wherein $0 \leq b \leq 0.5$ and $0 \leq c \leq 0.05$); $Li_aNi_{1-b-c}Co_bB'_cD'_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cD'_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$ and $0.001 \leq b \leq 0.1$); $Li_aCoG_bO_2$ (wherein $0.90 \leq a \leq 1.8$ and $0.001 \leq b \leq 0.1$); $Li_aMnG_bO_2$ (wherein $0.90 \leq a \leq 1.8$ and $0.001 \leq b \leq 0.1$); $Li_aMn_2G_bO_4$ (wherein $0.90 \leq a \leq 1.8$ and $0.001 \leq b \leq 0.1$); $QO_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the formulae above, A is Ni, Co, Mn, or a combination thereof; B' is Al, Ni, Co, Mn, Cr, Fe, Mg, Sr, V, a rare-earth element, or a combination thereof; D' is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof.

The compound may have a coating layer on a surface thereof, or the compound may be mixed with another compound having a coating layer. The coating layer may include an oxide, a hydroxide an oxyhydroxide, an oxycarbonate, or an hydroxycarbonate of a coating element. A compound that forms the coating layer may be amorphous or crystalline. The coating element included in the coating layer may be Mg, Al, Co, K, Na, Ca, Si, Ti, V, Sn, Ge, Ga, B, As, Zr, or a combination thereof. A process of forming the coating layer may be any coating method that does not affect physical properties of a cathode active material (e.g., spray coating or dipping) using the element in the compounds, and this may be well understood by those skilled in the art, and thus description thereof will be omitted here.

In the preparation of the cathode active material composition, a conducting agent, a binder, and a solvent are the same as those used in the preparation of the anode active material composition. Also, a plasticizer may be further added to the cathode active material composition and/or the anode active material composition to form pores in an electrode plate.

Amounts of the cathode active material, the conducting agent, the binder, and the solvent may be at the same levels used in a conventional lithium secondary battery. At least one of the conducting agent, the binder, and the solvent may be omitted depending on a use or a structure of the lithium battery.

Then, a separator that is to be interposed between the cathode and the anode is prepared. The separator may be any one of various separators conventionally used in a lithium battery. The separator may have a low resistance to ion flow and a high electrolytic solution-retaining capability. Examples of the separator are glass fiber, polyester, Teflon, polyethylene (PE), polypropylene, polytetrafluoroethylene (PTFE), and a combination thereof, and these separators may be in a non-woven or woven fabric form. For example, a separator suitable for a lithium ion battery may be a rollable separator formed of, for example, polyethylene or polypropylene, and a separator suitable for a lithium ion polymer battery may be a separator that has an excellent organic electrolytic solution-retaining capability. An example of a method of forming the separator will now be described in detail.

A polymer resin, a filler, and a solvent are mixed to prepare a separator composition. The separator composition may be directly coated on an electrode and dried to form a separator. Alternatively, the separator composition may be cast on a support, dried, and then separated from the support as a separator film. Then, the separator film may be laminated on an electrode, thereby forming a separator.

The polymer resin used in forming the separator may not be particularly limited and may be any one of various materials that are used as a binder of an electrode plate. Examples of the polymer are a vinylidenefluoride/hexafluoropropylene copolymer, polyvinylidenefluoride (PVDF), polyacrylonitrile, polymethylmethacrylate, and a combination thereof.

Then, an electrolyte is prepared.

The electrolyte may be an organic electrolytic solution. In addition, the electrolyte may instead be solid. Examples of the solid electrolyte are boron oxide and lithium oxynitride, but are not limited thereto. The solid electrolyte may be any one of various solid electrolytes used in the art. The solid electrolyte may be formed on the anode by, for example, sputtering.

For example, an organic electrolytic solution may be used as the electrolyte. The organic electrolytic solution may be prepared by dissolving a lithium salt in an organic solvent.

The organic solvent may be any one of various organic solvents used in the art. Examples of the organic solvent are propylene carbonate, ethylene carbonate, fluoroethylene carbonate, butylene carbonate, dimethyl carbonate, diethyl carbonate, ethyl methyl carbonate, methyl propyl carbonate, ethylpropyl carbonate, methyl isopropylcarbonate, dipropyl carbonate, dibutyl carbonate, benzonitrile, acetonitrile, tetrahydrofuran, 2-methyltetrahydrofuran, γ-butyrolactone, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethyleneglycol, dimethylether, and a mixture thereof.

The lithium salt may be any one of various lithium salts used in the art. Examples of the lithium salt are $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein each of x and y is a natural number), LiCl, LiI, and a combination thereof.

Figure 2:
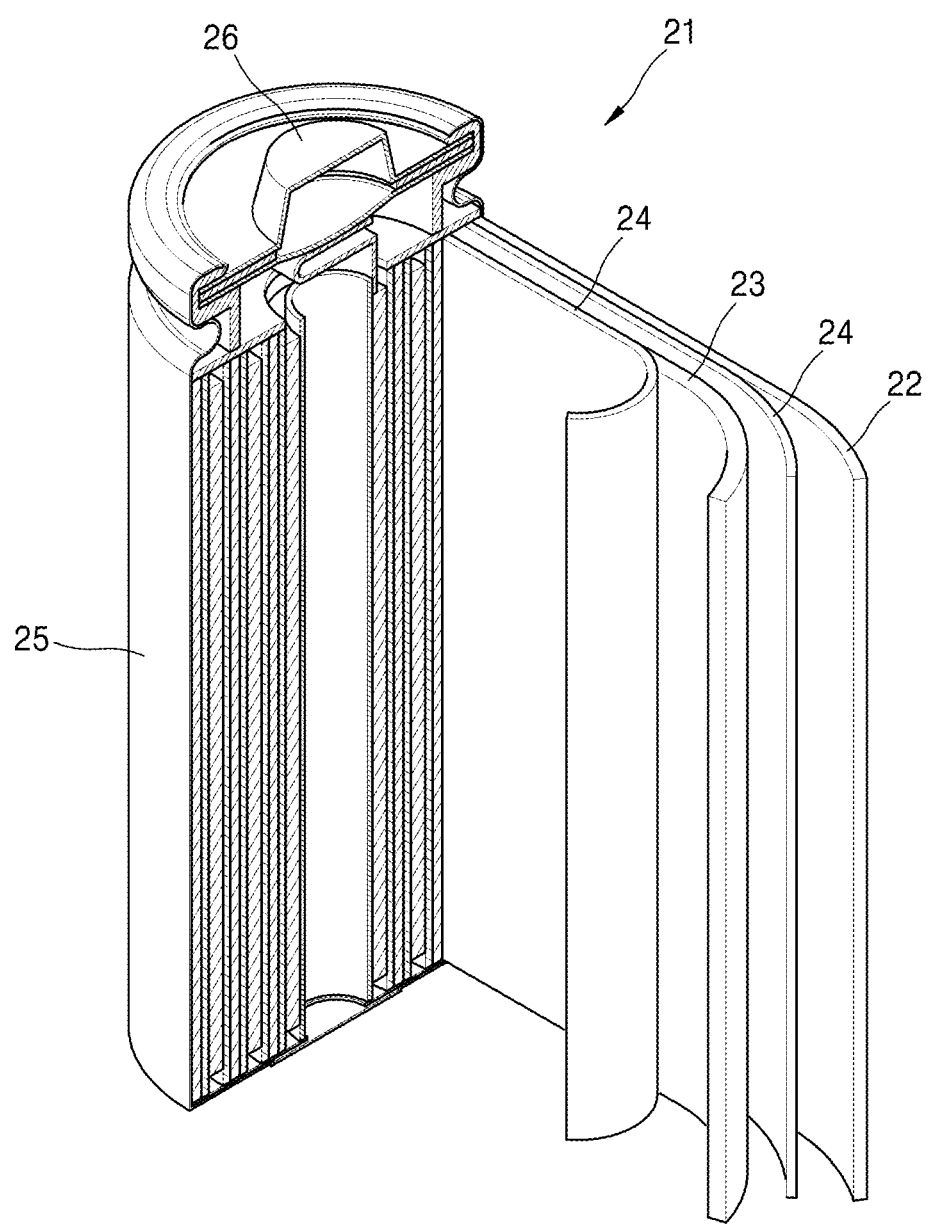
FIG. 2 is a schematic view of a lithium secondary battery according to another exemplary embodiment.

As shown in FIG. 2, a lithium secondary battery 21 includes a cathode 23, an anode 22, and a separator 24. The cathode 23, the anode 22, and the separator 24 are wound or folded, and then accommodated in a battery case 25. Subsequently, an electrolyte is injected into the battery case 25, and the battery case 25 is sealed by a cap assembly 26, thereby completing the manufacture of the lithium secondary battery 21. The battery case 25 may have a cylindrical shape, a rectangular shape, or a thin-film shape.

A battery assembly may be formed by interposing the separator between the cathode and the anode. A plurality of the battery assemblies may be stacked on each other to form a battery pack, and the battery pack may be used in high-capacity and high-performance devices, such as a notebook computer, a smart phone, an electric vehicle (EV), etc.

One or more embodiments will now be described in more detail with reference to the following examples. However, these examples are not intended to limit the scope of the one or more embodiments.

Examples 1: Composite Anode Active Material

Silicon particles and carbon nanotubes (CNTs) at a mixture weight ratio of 7:3 were milled for about 60 minutes in a SPEX mill to obtain a composite including silicon particles and CNTs.

100 milliliters (ml) of deionized water, 100 ml of ethanol, 50 ml of chloroform, and 40 percent by weight (wt %) of HF aqueous solution were added to 300 milligrams (mg) of the composite and an etching process was performed thereon for about 5 hours, and thus a composite containing hydride-terminated silicon and CNTs was obtained.

20 ml of 10-undecenoic acid was added to 2.8 grams (g) of the composite containing hydride-terminated silicon and CNTs. Here, an amount of the 10-undecenoic acid was about 1,000 parts by weight based on 100 parts by weight of the silicon particles, which was higher than its stoichiometric amount.

Hydrosilylation was performed on the resultant in a nitrogen atmosphere at a temperature of 40° C. for 24 hours to prepare a composite anode active material that contains silicon and CNTs, and that includes a unit chemically bonded to the silicon and represented by Formula 6a.

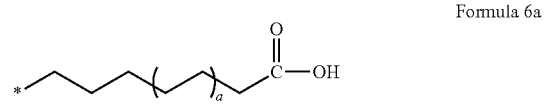

Formula 6a

In Formula 6a, * denotes a binding site to silicon particle, and a is 3.

Example 2: Composite Anode Active Material

NMP solution of polyvinyl alcohol was added to the composite anode active material prepared in Example 1, and the mixture was allowed for an esterification reaction at a temperature of about 200° C. for 2 hours to prepare a composite anode active material containing silicon and CNTs, including a unit that is chemically bonded to the silicon and represented by Formula 7a. A mixture weight ratio of the composite anode active material prepared in Example 1 and polyvinyl alcohol was 8:2.

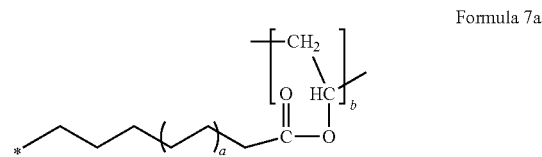

Formula 7a

In Formula 7a, * denotes a binding site to silicon particles, a is 3, and b is about 625.

The composite anode active material prepared in Example 2 contained silicon and CNTs and had a composite structure in which a unit represented by Formula 7A obtained from polyvinyl alcohol was chemically bonded to the silicon.

Comparative Example 1: Si/CNT Composite Anode Active Material

Silicon particles and CNTs at a mixing weight ratio of 7:3 were milled in a SPEX mill for about 60 minutes to obtain a composite anode active material.

Comparative Example 2: Anode Active Material Formed by Simply Blending Si/CNT Composite Anode Active Material and Polyvinylalcohol The composite anode active material prepared in Comparative Example 1 and polyvinylalcohol were simply blended at a mixing weight ratio of 8:2 to obtain an anode active material.

The anode active material prepared in Comparative Example 2 had no chemical bonding between the Si/CNT composite anode active material and polyvinyl alcohol.

Manufacturing Example 1: Anode and Coin-Half Cell

NMP, as a solvent, and lithium polyacrylate were mixed to the composite anode active material prepared in Example 1, as an anode active material to prepare a slurry. A mixing weight ratio of the composite anode active material prepared in Example 1 and lithium polyacrylate was 8:2. The slurry was bar-coated on a copper foil (at a thickness of about 15 um) by using a doctor blade. This was primarily dried at a temperature of 80° C., pressed, and secondarily dried under high-temperature reduced-pressure condition (in vacuum, at 200° C., for 2 hours) to prepare an anode.

A lithium metal was used as a counter electrode of the anode to prepare a coin-half cell (CR2032 type).

An electrolyte used in the preparation of the coin-half cell was a 1.3 molar (M) $LiPF_6$ solution dissolved in a solvent mixture prepared by mixing ethylene carbonate (EC), diethyl carbonate (DEC), and fluoroethylene carbonate (FEC) at a volume ratio of 2:6:2, and a separator used therein was a polypropylene separator (Celgard 3501).

Manufacturing Example 2: Anode and Coin-Half Cell

An anode and a coin-half cell was prepared in the same manner as in Manufacturing Example 1, except that the composite anode active material prepared in Example 2 was used instead of the composite anode active material prepared in Example 1 was used.

Comparative Manufacturing Example 1: Anode and Coin-Half Cell

An anode and a coin-half cell were prepared in the same manner as in Manufacturing Example 1, except that the composite anode active material prepared in Comparative Example 1 was used instead of the composite anode active material prepared in Example 1 was used.

Evaluation Example 1: Scanning Electron Microscope (SEM) Analysis

Figure 3A:
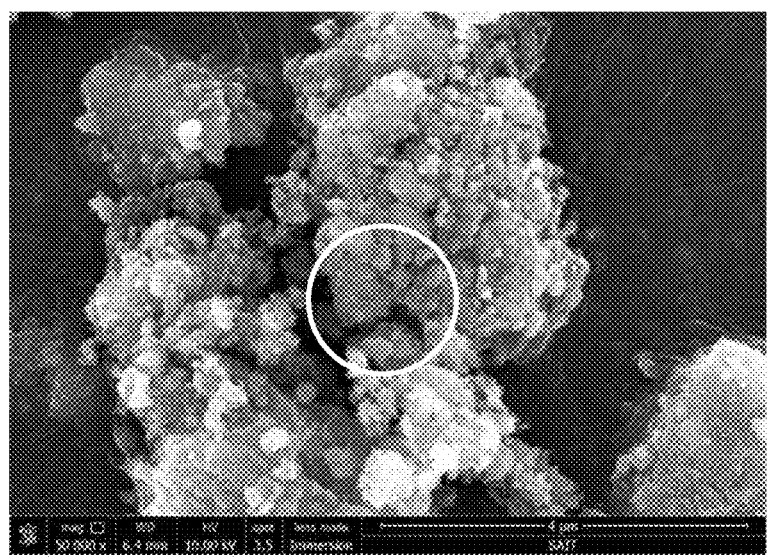
FIGS. 3A to 3C are scanning electron microscope (SEM) images) of a composite anode active material prepared in Example 1.
Figure 3B:
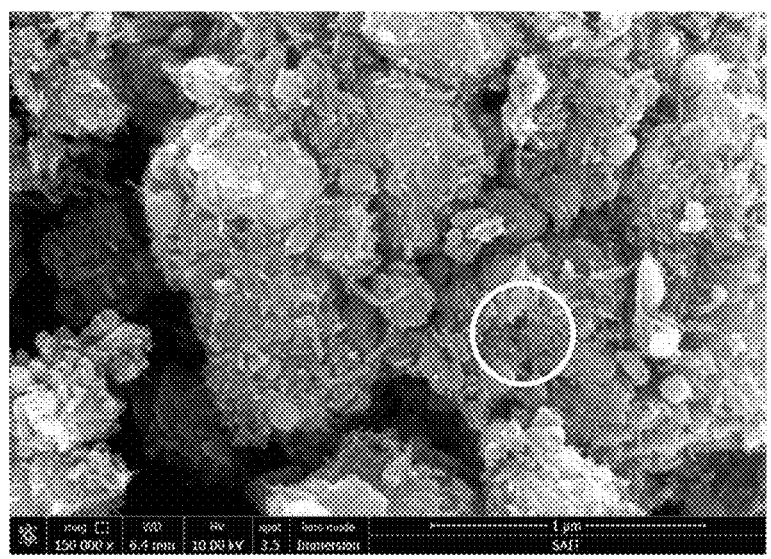
Figure 3C:
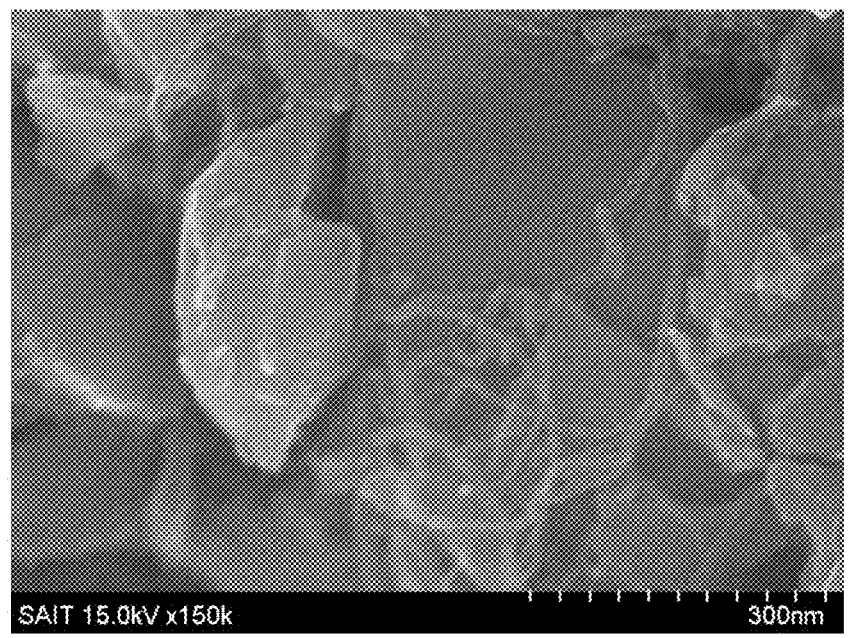

SEM analysis was performed on the composite anode active material prepared in Example 1, and the results are shown in FIGS. 3A to 3C. The SEM analysis was performed by using S-5500 (available from Hitachi).

FIG. 3A is an SEM image of the composite anode active material prepared in Example 1, FIG. 3B is an enlarged view of a circled area in FIG. 3A, and FIG. 3C is an enlarged view of a circled area in FIG. 3B.

Referring to FIGS. 3A to 3C, a shape of the composite anode active material prepared in Example 1 could have been confirmed.

Evaluation Example 2: Fourier Transform Infrared Spectroscopy (FT-IR) Analysis

Figure 4:
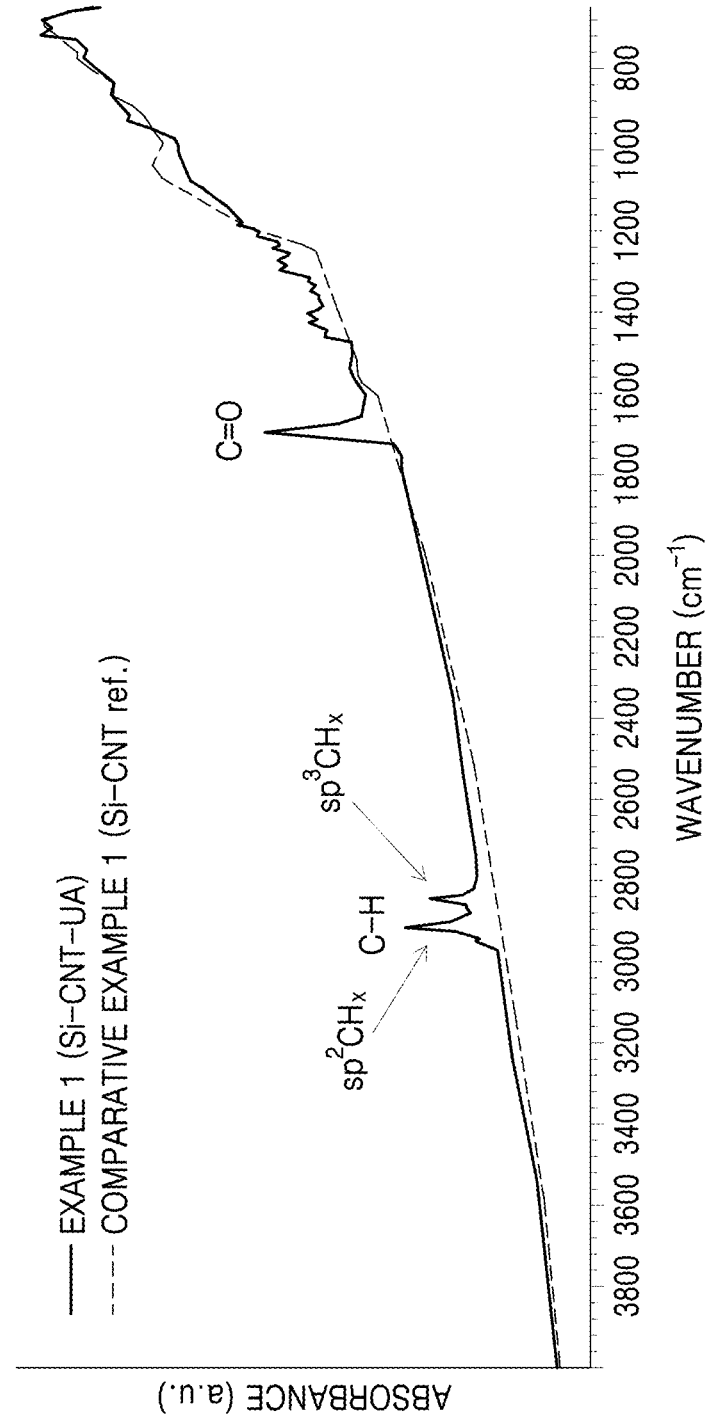
FIG. 4 is a graph of absorbance (arbitrary unit, a. u.) versus wavenumber (reverse centimeter, $cm^{-1}$), which is a Fourier transform infrared (FT-IR) spectroscopy analysis graph of composite anode active materials prepared in Example 1 and Comparative Example 1.

FT-IR analysis was performed on the composite anode active materials prepared in Example 1 and Comparative Example 1, and the results of the analysis are as shown in FIG. 4.

Referring to FIG. 4, the composite anode active material prepared in Example 2 had peaks generated by C—H stretching within 2,800 to 3,000 reverse centimeters ($cm^{-1}$) and peaks generated by C=O stretching within 1,650 to 1,750 $cm^{-1}$, and thus it may be confirmed that the unit derived from the hydrosilylation product of 10-undecenoic acid was chemically bonded to a surface of silicon.

Evaluation Example 3: Charging/Discharging Characteristics

Charging/discharging characteristics of the coin-half cells prepared in Manufacturing Example 1 and Comparative Manufacturing Example 1 were evaluated by using a charging/discharging device (model: TOYO-3100 available from TOYO). In the first cycle (n=1), each of the coin-half cells was charged at room temperature (25° C.) at a C-rate of 1 C (unit: milliamperes per gram (mA/g)) until a voltage was 0.01 volts (V), and was discharged at a rate of 1C until a voltage was 1.5 volts (V). Then, the cell rested for 10 minutes. Subsequently, in the second cycle and cycles thereafter (n≥2), the cell was charged at room temperature (25° C.) at a rate of 1 C until a voltage was 0.01 V, and was discharged at a rate of 1 C until a voltage was 1.5 V. The cell underwent 100 cycles of the charging/discharging process (i.e., n=100).

Initial Efficiency and Capacity Retention Ratios

Figure 5:
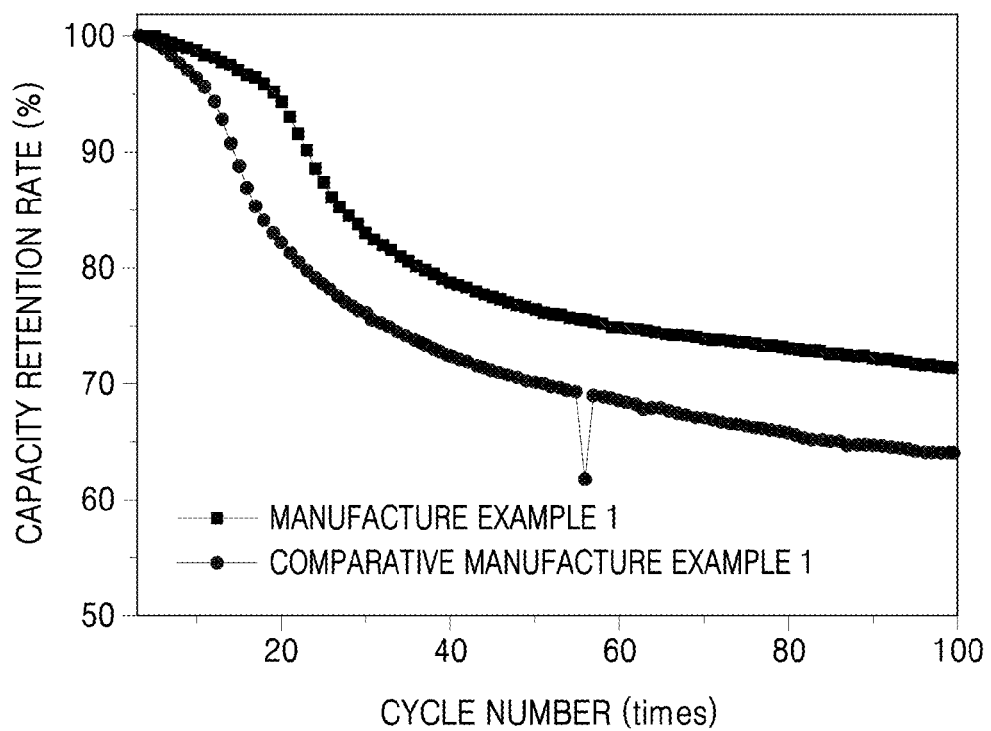
FIG. 5 is a capacity retention rate (percent, %) versus cycle number graph, illustrating cycle life of coin-half cells prepared in Manufacturing Example 1 and Comparative Manufacturing Example 1.

Initial efficiency and capacity retention ratios of the coin-half cells prepared in Manufacturing Example 1 and Comparative Manufacturing Example 1 were calculated as defined in Equations 1 and 2. The results of capacity retention ratio analysis are as shown in FIG. 5 and Table 1, and the results of initial efficiency analysis are as shown in Table 1.

Initial efficiency (%)=(Discharge capacity of $1^{st}$ cycle/charge capacity of $1^{st}$ cycle)×100     Equation 1

Capacity retention ratio (%)=(Discharge capacity of $100^{th}$ cycle/discharge capacity of $1^{st}$ cycle)×100     Equation 2

TABLE 1

|  | Initial efficiency (%) | Capacity retention ratio (%) |
|---|---|---|
| Manufacturing Example 1 | 89.0 | 71.3 |
| Comparative Manufacturing Example 1 | 87.7 | 63.9 |

As shown in Table 1 and FIG. 5, the coin-half cell prepared in Manufacturing Example 1 had improved lifespan and initial efficiency compared to those of the coin-half cell prepared in Comparative Manufacturing Example 1.

Initial efficiency and capacity retention ratios of the coin-half cell prepared in Manufacturing Example 2 was measured in the same manner as in Manufacture Example 1.

The coin cell prepared according to Manufacture Examples 2 had Initial efficiency and capacity retention ratios similar to those of the coin-half cell prepared in Manufacturing Example 1.

As described above, when a composite anode active material according to the one or more of the above embodiments is used, destruction of an electrode due to volume expansion during charging/discharging of a battery may be prevented. Therefore, when an anode including the composite anode active material is used, a lithium secondary battery with improved durability and lifespan characteristics may be manufactured.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the present disclosure as defined by the following claims.

What is claimed is:

1. A composite anode active material comprising:
a silicon material; and
a coating layer formed on at least a portion of a surface of the silicon material,
wherein the coating layer is chemically bonded to the silicon material,
wherein the coating layer comprises a hydrosilylation product of a C4-C30 alkene comprising a terminal —C(=O)OR group, wherein R is a hydrogen, a C1-C5 alkyl group, a C2-C6 heteroalkyl group, a C6-C12 aryl group, or a C7-C13 arylalkyl group, each of which except hydrogen is substituted or unsubstituted, and
wherein the coating layer further comprises a polymer that has been chemically reacted with the —C(=O)OR group of the hydrosilylation product.

2. The composite anode active material of claim 1, wherein the polymer before reacting comprises a hydroxyl group (—OH) capable of reacting with the —C(=O)OR group of the hydrosilylation product.

3. The composite anode active material of claim 1, wherein the hydrosilylation product of the C4-C30 alkene is a hydrosilylation product of a hydride-terminated silicon material and the C4-C30 alkene.

4. The composite anode active material of claim 1, wherein the C4-C30 alkene comprising the terminal —C(=O)OR group is a compound represented by Formula 1:

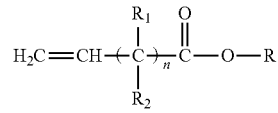

Formula 1 wherein, in Formula 1,
n is an integer of 1 to 10, and
$R_1$, $R_2$, and R are each independently a hydrogen, a C1-C5 alkyl group a C2-C6 heteroalkyl group, a C6-C12 aryl group, or a C7-C13 arylalkyl group, each of which is substituted or unsubstituted.

5. The composite anode active material of claim 4, wherein the compound represented by Formula 1 is a compound represented by Formula 2:

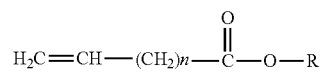

Formula 2 wherein, in Formula 2,
n is an integer of 1 to 10, and
R is a hydrogen, a methyl group, or an ethyl group.

6. The composite anode active material of claim 4, wherein the compound represented by Formula 1 is one of compounds represented by Formulae 3 to 5, 10-undecenoic acid, methyl 10-undecenoate, ethyl 10-undecenoate, 4-pentenoic acid, methyl 4-pentenate, ethyl 4-pentenate, 2-Methyl-4-pentenoic acid, 3-Methyl-4-pentenoic acid, 2,2-dimethyl-4-pentenoic acid, 8-nonenoic acid, methyl 8-nonenoate, and ethyl 8-nonenoate:

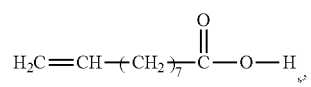

Formula 3

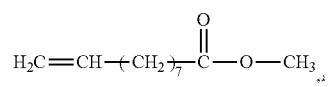

Formula 4

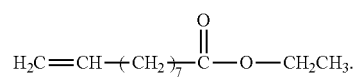

Formula 5

7. The composite anode active material of claim 1, wherein the polymer is at least one selected from a polyvinylalcohol, a polyvinylacetate, and a cellulose ether.

8. The composite anode active material of claim 1, wherein the silicon material is at least one selected from silicon (Si), $SiO_x$ (wherein 0<x<2), and a silicon alloy.

9. The composite anode active material of claim 1, wherein an amount of the C4-C30 alkene comprising the terminal —C(=O)OR group is in a range of about 0.01 part to about 50 parts by weight based on 100 parts by weight of the silicon material.

10. The composite anode active material of claim wherein an amount of the polymer is in a range of about 0.01 part to about 50 parts by weight of the silicon material.

11. The composite anode active material of claim 1, wherein the coating layer comprises a unit represented by Formula 6:

Formula 6

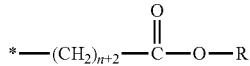

wherein, in Formula 6,
n is an integer of 1 to 10, and
R is a hydrogen, a methyl group, or an ethyl group, and
* refers to a binding site to a surface of the silicon material.

12. The composite anode active material of claim 1, wherein the coating layer comprises a unit represented by Formula 7:

Formula 7

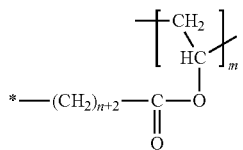

wherein, in Formula 7,
n is an integer of 1 to 10,
m is an integer of 5 to 18,000, and
* is a binding site to a surface of the silicon material.

13. The composite anode active material of claim 1 further comprising a carbon material.

14. A method of preparing the composite anode active material of claim 1, the method comprising:
    obtaining a hydride-terminated silicon material by etching the silicon material;
    reacting the hydride-terminated silicon material with a C4-C30 alkene comprising a terminal —C(=O)OR group to obtain a hydrosilylation product comprising a terminal —C(=O)OR group, wherein R is a hydrogen, a C1-C5 alkyl group, a C2-C6 heteroalkyl group, a C6-C12 aryl group, or a C7-C13 arylalkyl group, each of which except hydrogen is substituted or unsubstituted to obtain the composite anode active material, and
    reacting a polymer comprising a functional group capable of reacting with the terminal —C(=O)OR group of the hydrosilylation product to obtain the composite anode active material.

15. The method of claim 14, further comprising
    mixing the silicon material and a carbon material to obtain a mixture; and
    milling the mixture before the obtaining of the hydride-terminated silicon material.

16. An anode comprising a composite anode active material, wherein the composite anode active material comprises:
    a silicon material; and
    a coating layer formed on at least a portion of a surface of the silicon material,
    wherein the coating layer is chemically bonded to the silicon material,
    wherein the coating layer comprises a hydrosilylation product of a C4-C30 alkene comprising a terminal —C(=O)OR group, wherein R is a hydrogen, a C1-C5 alkyl group, a C2-C6 heteroalkyl group, a C6-C12 aryl group, or a C7-C13 arylalkyl group, each of which except hydrogen is substituted or unsubstituted, and
    wherein the coating layer further comprises a polymer that has been chemically reacted with the —C(=O)OR group of the hydrosilylation product.

17. A lithium secondary battery comprising the anode of claim 16.

* * * * *